Aug 5, 1941.    B. COOPER    2,251,351
TREADLE PROCESS
Filed Dec. 3, 1940    4 Sheets-Sheet 1
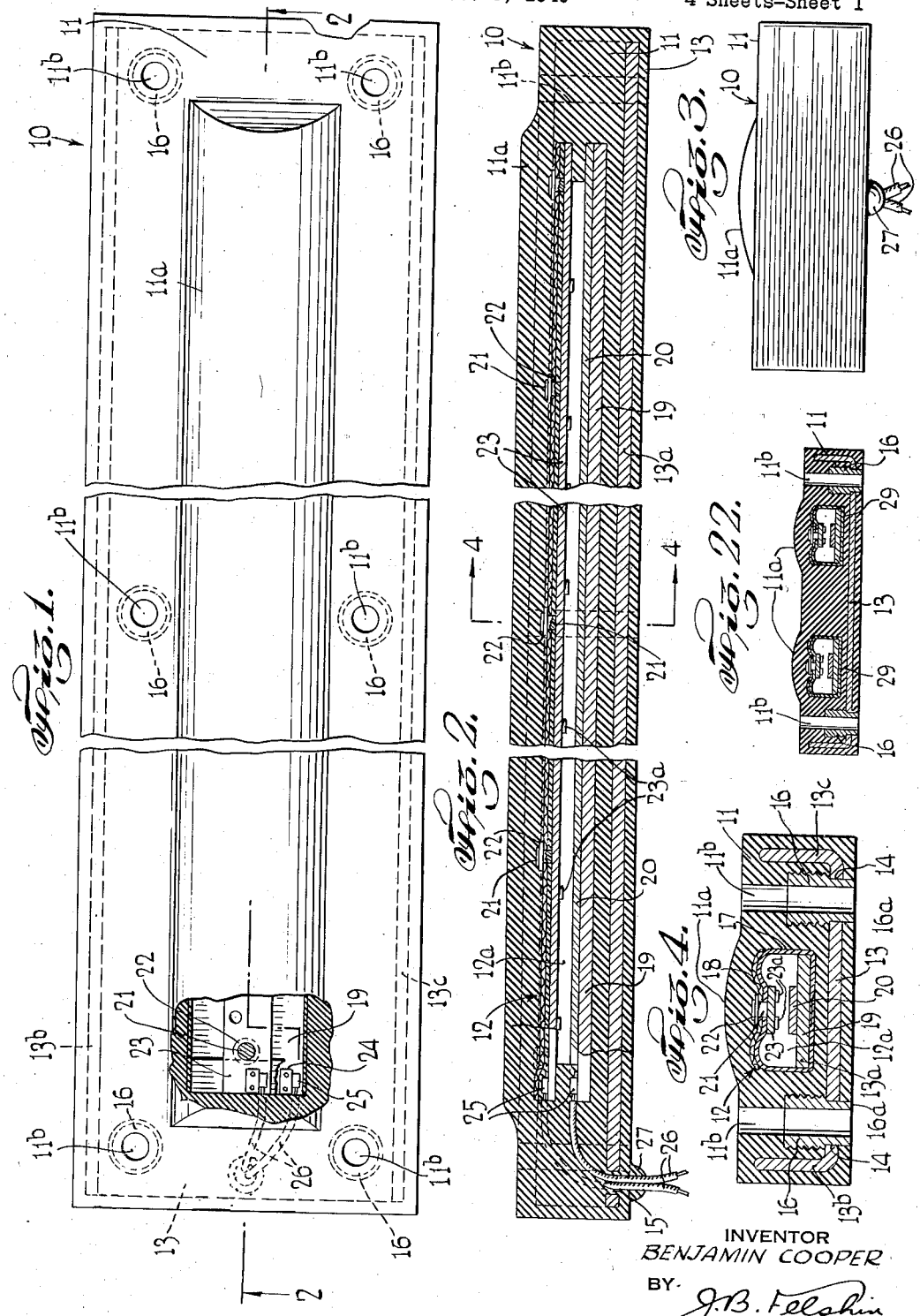
INVENTOR
BENJAMIN COOPER
BY J.B. Felshin
ATTORNEY Aug 5, 1941.    B. COOPER    2,251,351
TREADLE PROCESS
Filed Dec. 3, 1940    4 Sheets-Sheet 2
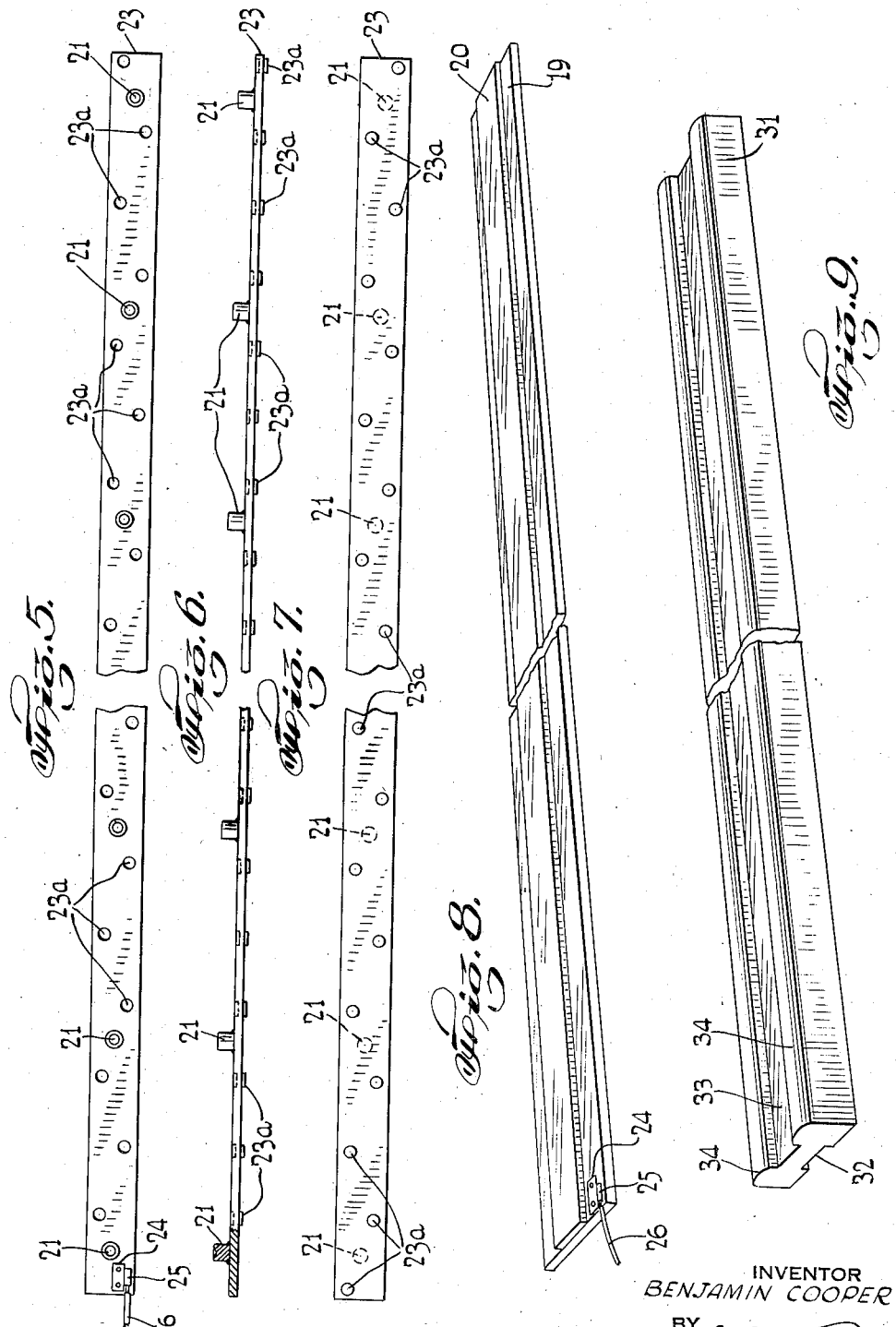
INVENTOR
BENJAMIN COOPER
BY
J. B. Felshin
ATTORNEY

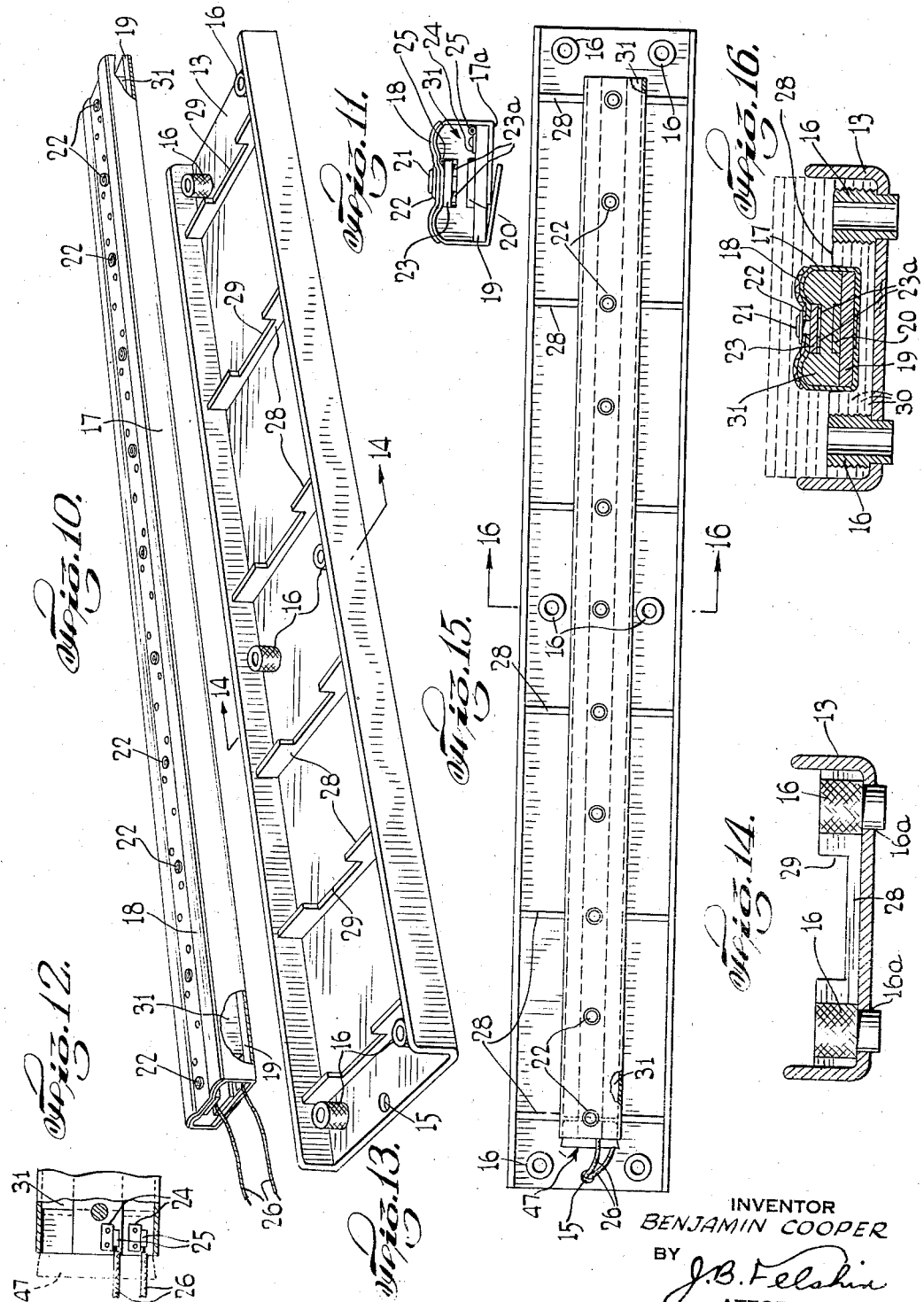

Aug 5, 1941.    B. COOPER    2,251,351
TREADLE PROCESS
Filed Dec. 3, 1940    4 Sheets-Sheet 4
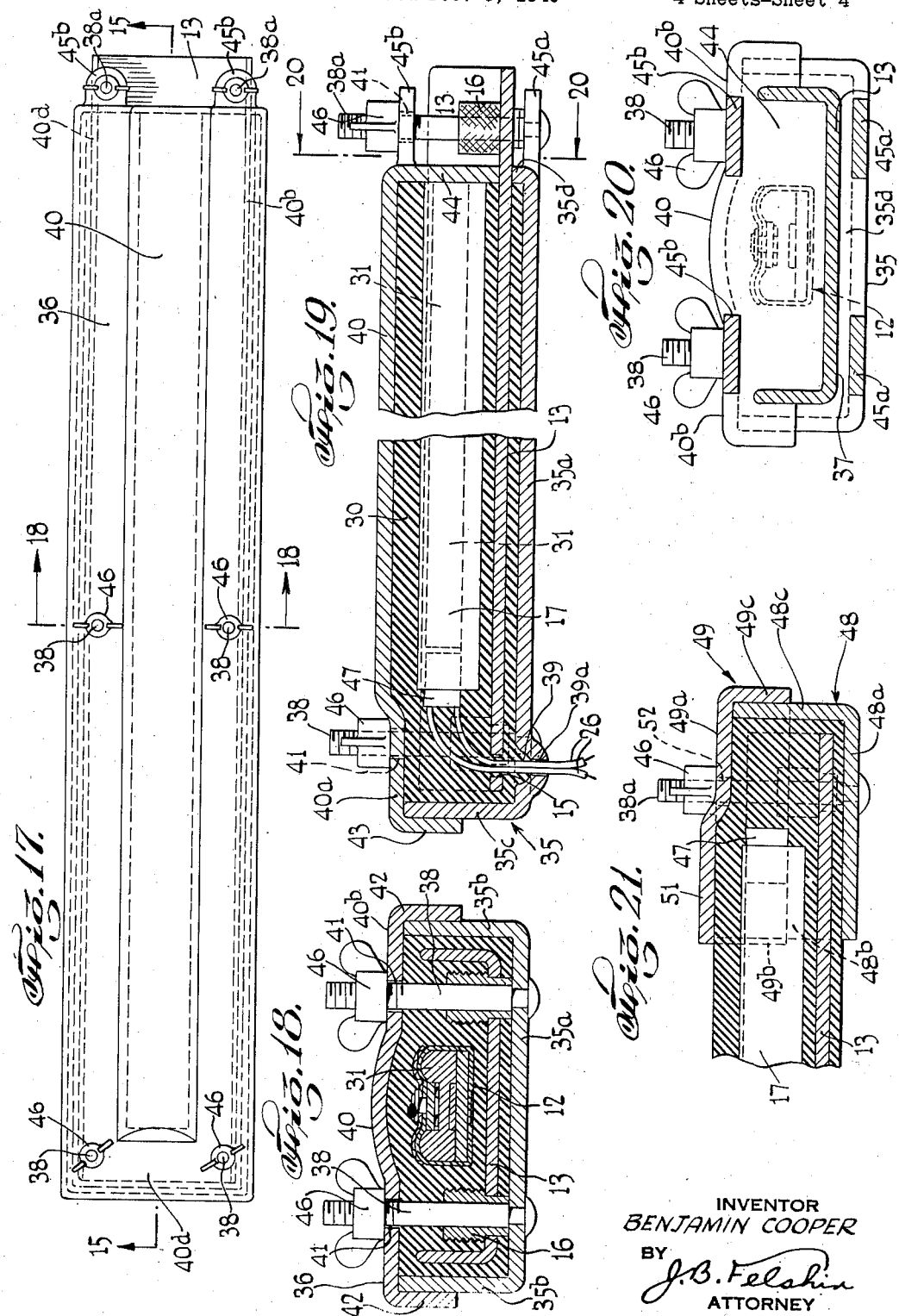
INVENTOR
BENJAMIN COOPER
BY
J.B. Felshin
ATTORNEY Patented Aug. 5, 1941

2,251,351

UNITED STATES PATENT OFFICE 2,251,351

TREADLE PROCESS

Benjamin Cooper, Jersey City, N. J.

Application December 3, 1940, Serial No. 368,409

16 Claims. (Cl. 18—59)

This invention relates to treadle switches and methods of making the same. It is particularly directed to a method of making a switch adapted to be embedded in a roadway and actuated by the wheels of vehicles passing thereover.

An object of this invention is to provide a highly improved, simple, and economical process for making contact treadle switches.

In installations of treadles of the character described, water will often seep through the treadle housing and corrode the contact strips of the switch units. It is therefore another object of this invention to envelop the contact strips of the treadle in a waterproof cured rubber envelope integrally fused with the molded rubber housing of the treadle so that water cannot seep into the envelope.

In manufacturing treadles of the character described it has been found that contact strips will often shift during the curing process in molding the rubber housing, by the flow of viscous rubber, so that upon completion of the treadle the contact strips would be out of alignment in the treadle housing and could therefore, not be used with any degree of accuracy. It is, therefore, yet another object of this invention to provide a process of the character described including steps to prevent shifting of a switch unit during the curing process by providing cured rubber forms in the steel shell to hold said switch unit in alignment with said shell during the curing process.

Still a further object of this invention is to provide a highly improved method of the character described consisting in attaching a pair of contact strips to the inner surfaces of the bottom and top walls of a tubular envelope made of cured rubber, and placing within the envelope and between the contact strips a removable metal core, placing the assembly on a series of transverse partitions of uncured rubber supported within a channel shaped shell, and placing within said shell and around said assembly uncured rubber strips, placing the entire assembly within a mold and applying heat to said mold to fuse the uncured rubber to the cured rubber envelope and partitions, removing the device from the mold and then removing the core from the envelope, thus preventing the viscous uncured rubber from getting in between the contact strips during the molding process.

Other objects of this invention will in part be obvious and in part hereinafter pointed out.

The invention accordingly consists in the combination of steps, features of construction, combinations of elements, and arrangements of parts which will be exemplified in the method and construction hereinafter described, and of which the scope of application will be indicated in the following claims.

In the accompanying drawings, in which is shown one of the various possible illustrative embodiments of this invention—

Fig. 1 is a top plan view of a completed treadle embodying the invention, with sections broken away;

Fig. 2 is a longitudinal, cross-sectional view taken along the line 2—2 of Fig. 1;

Fig. 3 is an elevational end view of the treadle;

Fig. 4 is a cross-sectional view taken along the line 4—4 of Fig. 2;

Fig. 5 is a top plan view of the upper contact strip;

Fig. 6 is a side view of the contact strip shown in Fig. 5;

Fig. 7 is a bottom plan view of the contact strip shown in Fig. 5;

Fig. 8 is a perspective view of the lower contact strip;

Fig. 9 is a perspective view of a pin or core employed in carrying out the method embodying the invention.

Fig. 10 is a perspective view of the assembly of the two contact strips and core with a cured rubber envelope, and illustrating another step in said method;

Fig. 11 is an end view of the assembly as shown in Fig. 10;

Fig. 12 is a top plan view of the assembly of the cable end of the contact strips, with parts broken away and in cross-section;

Fig. 13 is a perspective view of a steel shell with cured rubber forms in place, ready to receive the assembly shown in Fig. 10;

Fig. 14 is a cross-sectional view taken along line 14—14 of Fig. 13;

Fig. 15 is a top plan view showing the assembly of the steel shell and the assembly of the contact strips as shown in Fig. 10;

Fig. 16 is a cross-sectional view along line 16—16 of Fig. 15, with uncured rubber sheets laid into the bottom of said shell between the cured rubber forms;

Fig. 17 is a top plan view showing the assembly of Fig. 15 in a mold;

Fig. 18 is a cross-sectional view taken along the line 18—18 of Fig. 17;

Fig. 19 is a cross-sectional view taken along line 19—19 of Fig. 17;

Fig. 20 is a cross-sectional view taken along the line 20—20 of Fig. 19;

Fig. 21 is a side elevation, cross-sectional view of the end of the treadle in an end mold, illustrating a further step in the improved method; and Fig. 22 is a transverse cross-sectional view of a two contact treadle embodying the invention.

Referring now in detail to the drawings, 10 designates a treadle switch embodying the invention, adapted to be embedded in a roadway, transversely thereof, and actuated by the wheels of vehicles passing thereover. Said treadle switch comprises an elongated, prismatic shaped housing 11 containing a switch unit 12. Housing 11 is made of rubber in which there is embedded a steel shell 13 having a base wall 13a, disposed above the undersurface of the housing, and parallel, spaced side walls 13b and 13c disposed inwardly of and adjacent to the vertical walls of said housing. The housing 11 extends beyond the ends of the steel shell 13 and above the side walls 13b and 13c. Base wall 13a is provided with two aligned rows of through openings 14 adjacent to the side walls 13b and 13c, and with a through opening 15 disposed at one end of said base wall. Mounted in each of the openings 14, preferably welded therein, are bushings 16, extending vertically upward from base 13a and provided with a depending portion 16a projecting downwardly from the underside of said base.

Said housing 11 is formed with a longitudinal chamber 12a disposed above base wall 13a and between side walls 13b and 13c, and below the upper surface of said housing. Chamber 12a terminates short of both ends of shell 13.

Switch unit 12 comprises an elongated, substantially prismatic shaped rubber envelope 17 forming the interior surfaces of chamber 12a. Cemented to the upper surface of the top portion of envelope 17 is a longitudinal duck strip 18. Said envelope and said duck strip is integral with housing 11 and fused thereto, as will appear from the description of the method of making the treadle. Longitudinally disposed with envelope 17 and cemented to the upper surface of its bottom wall is an elongated flat plate 19. Integral with said plate along its center line is an elongated metal contact strip 20. Fixed to housing 11, as by rivets 21 passing through the upper wall of envelope 17 and duck strip 18, and by washers 22 on said rivets, is an elongated metal contact strip 23, of the same width as strip 20, disposed above said strip and provided with depending extrusions 23a. Strip 23 is adapted to register with strip 20 upon depression of housing 11.

Fixed to one end of the upper surface of contact strip 23 is a plate 24 having a bent-over portion 25 gripping one end of a cable 26 embedded in housing 11. Said cable passes through the opening 15 of shell 13, and out of said housing through a protrusion 27 of rubber projecting from the undersurface of said housing adjacent opening 15. Fixed to one end of plate 19, adjacent contact strip 20, is also a plate 24 having a bent-over portion 25 gripping one end of a cable 26. Said cable also passes through opening 15 and out of said housing through protrusion 27.

The upper surface of housing 11 is preferably made with a longitudinally raised center portion 11a, in perpendicular alignment with the contact strips 20 and 23. This construction adds to the flexibility of the treadle. Housing 11 is further provided with through openings 11b registering with the openings in bushings 16.

Treadle switch 10 is embedded in a roadway with the horizontal top edges thereof flush with the surface of the roadway, and fixed therein by means of bolts (not shown) passing through the openings 11b. Thus portion 11a of said switch is slightly higher than the surface of the roadway adding to the position action of said treadle switch.

Treadle switch 10 is preferably made in the following manner:

The steel shell 13 is thoroughly sand-blasted on all sides to scar the surfaces of said shell to insure adhesion thereto of rubber cement and rubber during a curing process. The knurled bushings 16 are placed in openings 14. Placed in shell 12 are a plurality of parallel, vertical, transverse cured rubber forms or partitions 28, shaped at their bottom and side edges to fit the inside contours of shell 12. Each form is provided with a central notch 29 in its upper edge. Said forms are first treated with rubber binding cement on their exterior edges and then cemented to the base 13a and sidewalls 13b and 13c of said shell. The partitions or forms 28 are equally spaced apart as illustrated in Fig. 9 of the drawings, and are of less height than side walls 13b and 13c.

The inside surfaces of shell 12 between, forms 28, are then treated with rubber binding cement. Sheets of uncured rubber 30 are likewise treated with rubber binding cement and cemented to the inside surfaces of shell 13 between the forms 28 and over bushings 16. Shell 12 is then laminated with the treated cemented together sheets 28 until the built up sections of uncured rubber are flush with the lower edges of notches 29 in forms 28.

Switch unit 12 is assembled in the following manner:

The lower plate 19, with contact strip 20 preferably welded thereto is thoroughly sand-blasted on its lower surface. Contact strip 23, provided with the depending extrusions 23a, has spot welded to its upper surface the rivets 21. Strip 23 is then sand-blasted on its upper surface. Cables 26 are then fixed to plate 19 and strip 23 in the manner described above.

A pin or core 31, made preferably of polished steel and slightly shorter in length than plate 19 and of the same width of said plate, is formed with a longitudinal groove 32 in its underside equal in width to strip 23. Groove 33 is provided with raised rounded shoulders 34.

Core 31 is now placed over plate 19 and contact strip 20 so that said strip fits into notch 32, and the edges of said core are flush with the edges of said plate, one end of said core being set back slightly from the cable end of said plate. Contact strip 23 is then placed into groove 33 of said core with the extrusions 33a adjacent the bottom of said groove, the cable end of said strip being in perpendicular alignment with the cable end of plate 19, and with said strips in co-extensive relation.

The cured rubber envelope 17 is made from a cured rubber sheet 17a equal in length to plate 19. Said rubber sheet is slit centrally with a longitudinal row of small openings to correspond to the rivets 22 on contact strip 23. Sheet 17a is treated with rubber binding cement about the slitted openings, and then cemented to the top surface of strip 23, with the rivets projecting upwardly through said slits. The ends of said sheet are permitted to hang over the sides of core 31. Duck strip 18, also slit with a longitudinal row of small openings corresponding to the number of rivets 21, is treated with rubber binding cement and cemented to the cured rubber sheet 17a, the rivets 21 also passing through the slitted openings in the duck strip. Washers 22 are then placed over rivets 21, and the rivets peaned in the well known manner, forcing washers 22 against the duck strip 18, rubber sheet 17a, fastening the contact strip 23 to said strip and sheet.

The underside of plate 19 and the ends of the cured rubber sheets 17a are now treated with rubber binding cement. The ends of said sheet are then drawn tightly about the sides of core 31 and cemented to the base of plate 19 to form the envelope 17 previously described, (Fig. 11). The assembly thus formed (Fig. 10) is placed into the steel shell 13, plate 19 resting in the notches 29 of the cured rubber forms 28 (Figs. 15 and 16).

The assembly is then placed in a mold 35 (Figs. 17 to 20) provided with a cover 36. Mold 35 comprises a base 35a, slightly wider than shell 13, two side walls 35b, an end wall 35c, and an end wall 35d, having a notch 37 adapted to fit the outside contours of shell 13. Fixed to the base or bottom wall 35a are two rows of aligned upstanding pins 38 threaded at their upper ends and spaced apart in accordance with the desired location of openings 14 in the resulting shell 13. Base 35a is further provided at one end thereof with a depressed portion 39, having a through opening 39a for the purpose hereinafter appearing.

Cover 36 is provided with a raised central longitudinal portion 40 terminating in a horizontal shoulder 40a at one end, flush with the horizontal shoulder 40b of said cover. Shoulders 40b are formed with two rows of aligned through openings 41 adapted to register with pins 38 of the mold 35. Cover 36 is further provided with the depending side walls 42, a depending end wall 43, and a depending end wall 44, formed to fit the contours of shell 13.

Base 35a and cover 36 are formed at one end with the extending tongues 45a and 45b, respectively, tongue 45a being provided with two aligned upwardly extending pins 38a, threaded at their upper end, and tongue 45b being formed with two through openings 41a adapted to receive the pins 38a. The pins 38a are so fixed to tongue 45a as to register with the openings in bushings 16 of shell 13 as will hereinafter appear.

A cured rubber plug 47 is now inserted between the contact strips 20 and 23 at their cable ends and within envelope 17, for purposes hereinafter appearing. Steel shell 13, together with the switch unit 12 and form 31, is now placed in mold 35, the cables 26 being passed through the opening 15 in shell 13, and the opening 39a in the bulge 39, pins 38 and 38a passing through the openings in bushings 16. Shell 13 is permitted to rest on the depending portions 16a of the bushings 16, thus forming an air space between the base 35a of said mold and base 13a of said shell. One end of envelope 17 is spaced inwardly of wall 35c, and the other end of said envelope is flush with end wall 35a. Uncured rubber sheets 30 are then treated with rubber binding cement and are placed in layers in shell 13 on opposite sides of envelope 17 and thereabove and between said envelope and wall 35c.

The lamination of shell 13 is continued until the built up sections of uncured rubber sheets 30 extend above the side walls 13b and 13c. The section of shell 13 extending beyond end wall 35d is not laminated with rubber for reasons hereinafter appearing.

Cover 36 is then placed over the mold 35, the threaded ends of pins 38 and 38a passing through the openings 41 and 41a, the cover then being fastened by turning the wing nuts 46.

It will be noted that in fastening cover 36 on mold 35, notch 37 in end wall 35d of said mold fits tightly about shell 13, while the depending wall 44 of said cover fits tightly into the inside of shell 13, contacting one end of envelope 17 and the core 31. Thus both ends of the envelope are completely sealed against any leakage, as will hereinafter appear.

Mold 35 is now placed in a curing oven for eight hours to cure the rubber sheets 30. During the curing process the uncured rubber sheets 30 become viscous, the cured rubber forms 28, the cured rubber envelope 17 and plug 47 remaining in their solid form. Thus during the curing process the forms 28 hold the switch unit 12 in its proper place in the shell 13 and envelope 17 prevents any of the now flowing rubber from running between the contact strips 20 and 23 or from adhering to the core 31; the plug 47 prevents any of the rubber from flowing into the end of switch unit 12. The end wall 35d of mold 35 and the depending wall 44 of cover 36 prevent any rubber from flowing out of the ends of mold 35. Furthermore, the cured rubber fuses to the uncured rubber during the molding operation.

The excess rubber during the curing process will flow over the side walls 13b and 13c of shell 13 into the space between said side walls and base of said shell and the side walls and base of said mold to form the sides and bottom of the housing of the treadle switch 10, and will also flow into recess 39 to form protrusion 27, which seals opening 39a and encases the cables 26.

After eight hours in the curing oven, mold 35 is removed and permitted to cool. Cover 36 is then removed from mold 35. Core 31 is easily withdrawn from envelope 17 leaving air chamber 12a in housing 11. Treadle 10 may then be removed from mold 35, an "air knife" being used to avoid injuring the smooth surfaces of housing 11. The treadle 10 may then be tested for compression, resiliency, insulation resistance, etc., using the well known standard methods of testing.

The next step is to seal the open end of chamber 12a.

For this purpose there is employed an end mold 48 having a cover 49 (Fig. 21). Mold 48 comprises a bottom wall or base 48a, two upstanding side walls 48b, and an upstanding end wall 48c. Base 48a is provided with two upright aligned pins 50, threaded at their upper ends and adapted to be received by bushings 16 of shell 13. Cover 49 is provided with a top wall 49a, two depending side walls 49b and a depending end wall 49c. Top wall 49a is further provided with a raised curved portion 51, similar to portion 40 in cover 36, having horizontal shoulders 51a. Disposed in shoulders 51a are two aligned through openings 52, adapted to receive the pins 50.

After treadle has been put through the tests previously described, a cured rubber plug 47 is inserted in the open end of said treadle between the contact strips 20 and 23, sealing the air space between said strips. The incompleted end of treadle 10 is then placed in end mold 48, pins 50 passing through the two end bushings 16. The end portion of shell 13 is then laminated with sheets of uncured rubber treated with rubber binding cement in the same manner as previously described. Cover 49 is then set over mold 48, pins 50 being received by openings 52, the cover being tightened by turning the wing nuts 46.

The end of treadle 10 is cured in the manner previously described. After eight hours curing and subsequent cooling, mold 48 is removed.

It will be noted that in removing treadle 10 from molds 35 and 48, pins 38, 38a and 50, upon being withdrawn, form the through openings 11b, previously described, in the housing 11.

While my process has been illustrated and described in relation to making a single contact treadle switch, it will be understood that the process herein described is equally applicable in making treadle switches of two or more contacts.

In making treadle switches with two or more switch units 12, shell 13 is made wider to accommodate the number of switch units desired. Cured rubber forms 28 are provided a number of notches 29 in their upper edges to correspond to the number of switch units desired (Fig. 22). Mold 35 is accordingly made wider to receive the wider shell 13, while cover 36 is provided with a number of raised, longitudinal portions 40 to form the raised longitudinal portions 11a of the housing 11 in perpendicular alignment with each of the switch units 12.

It will thus be seen that there is provided a process in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A process for making a switch consisting in placing against the inner surfaces of a tubular envelope of cured rubber a pair of opposed contact strips, placing within said envelope and between said contact strips a core to maintain said strips in spaced relation, placing the envelope within a mold together with uncured rubber placed outside the envelope, applying heat to the mold to cause the uncured rubber to fuse with and flow around said envelope to form a rubber housing, then removing the housing from the mold and removing the core.

2. A process for making treadle switches consisting in attaching to the inner surfaces of a tubular envelope of cured rubber a pair of opposed contact strips, placing within said envelope and between said contact strips a core, terminating short of one end of the envelope and extending to the other end of the envelope, to maintain said strips in spaced relation, placing a cured rubber plug into the first end of the envelope between the adjacent ends of the strips, placing the envelope within a mold together with uncured rubber placed outside the envelope, applying heat to the mold to cause the uncured rubber to fuse with and flow around said envelope and said plug to form a rubber housing having an open end, then removing the housing from the mold and removing the core from the open end of the envelope.

3. A process for making treadle switches consisting in attaching to the inner surfaces of a tubular envelope of cured rubber a pair of opposed contact strips, placing within said envelope and between said contact strips a core, terminating short of one end of the envelope and extending to the other end of the envelope, to maintain said strips in spaced relation, placing a cured rubber plug into the first end of the envelope between the adjacent ends of the strips, placing the envelope within a mold with one end of the envelope and core contacting one end of the mold, together with uncured rubber placed outside the envelope, applying heat to the mold to cause the uncured rubber to fuse with and flow around said envelope and said plug to form a rubber housing having an open end, then removing the housing from the mold and removing the core from the open end of the envelope.

4. A process for making treadle switches consisting in attaching to the inner surfaces of a tubular envelope of cured rubber a pair of opposed contact strips, placing within said envelope and between said contact strips a core, terminating short of one end of the envelope and extending to the other end of the envelope, to maintain said strips in spaced relation, placing a cured rubber plug into the first end of the envelope between the adjacent ends of the strips, placing the envelope within a mold with one end of the envelope and core contacting one end of the mold, together with uncured rubber placed outside the envelope, applying heat to the mold to cause the uncured rubber to fuse with and flow around said envelope and said plug to form a rubber housing having an open end, removing the housing from the mold and removing the core from the open end of the envelope, then placing a cured rubber plug into the end of the housing through which the core was removed, placing said end of said housing into a second mold together with uncured rubber and applying heat to said second mold to cause the uncured rubber to fuse with said plug and said end of said housing to enclose the length of said housing.

5. A process for making treadle switches consisting in attaching to the inner surfaces of a tubular envelope of cured rubber a pair of opposed contact strips, placing within said envelope and between said contact strips a core to maintain said strips in spaced relation, placing a plurality of cured rubber supports in a metal shell, placing the envelope on said supports in spaced relation relative to the walls of said shell, then placing the shell in a mold in spaced relation relative to one or more of the walls of said mold together with uncured rubber between the envelope and the shell, then applying heat to the mold to cause the uncured rubber to fuse with the cured rubber envelope and the cured rubber supports to form a rubber housing for the contact strips with the metal shell embedded therein, then removing the housing from the mold and withdrawing the core.

6. A process for making treadle switches consisting in attaching to the inner surfaces of a tubular envelope of cured rubber a pair of opposed contact strips, placing within said envelope and between said contact strips a core to maintain said strips in spaced relation, mounting a plurality of bushings in openings of a metal shell, with the lower portions of said bushings protruding underneath the base of said shell, placing a plurality of cured rubber supports in the metal shell, placing the envelope on said supports in spaced relation relative to the walls of said shell, placing the shell in a mold to rest in said mold on the protruding portions of said bushings, together with uncured rubber strips between the cured rubber envelope and said shell, then applying heat to said mold to cause the uncured rubber to fuse with the cured rubber envelope and the cured rubber supports, and to flow around the shell to form a rubber housing for the contact strips, with said shell and said bushings embedded therein, then removing the housing from the mold and withdrawing the core.

7. A process for making treadle switches consisting in attaching to the inner surfaces of a tubular envelope of cured rubber a pair of opposed contact strips, attaching to the upper exterior surface of said envelope an elongated strip of fabric, placing within said envelope and between said contact strips a core to maintain said strips in spaced relation, mounting a plurality of bushings in openings of a metal shell, with the lower portions of said bushings protruding underneath the lease of said shell, placing a plurality of cured rubber supports in the metal shell, placing the envelope on said supports in spaced relation relative to the walls of said shell, placing the shell in a mold to rest in said mold on the protruding portions of said bushings, together with uncured rubber strips between the cured rubber envelope and said shell, then applying heat to said mold to cause the uncured rubber to fuse with the cured rubber envelope and the cured rubber supports, and to flow around the shell to form a rubber housing for the contact strips, with said shell and said bushings embedded therein, then removing the housing from the mold and withdrawing the core.

8. A process for making treadle switches consisting in attaching to the inner surfaces of a tubular envelope of cured rubber, a pair of opposed contact strips, placing within said envelope and between said strips a core to maintain said strips in spaced relation, attaching to the upper exterior surface of said envelope an elongated strip of cloth, mounting a plurality of bushings in openings of a metal shell, with the lower portions of said bushings protruding underneath the base of said shell, placing a plurality of cured rubber supports in said shell, then sealing one end of said envelope with a cured rubber plug, placing the envelope on said supports in spaced relation to the walls of said shell, placing the shell in a mold to rest on the protruding portions of said bushings, together with uncured rubber strips and then applying heat to said mold, to cause the uncured rubber to fuse with the cured rubber envelope, the cured rubber supports and the cured rubber plug to form a housing for the contact strips with said shell and said bushings embedded therein, then removing the housing from said mold and withdrawing the core.

9. A process for making treadle switches consisting in attaching to the inner surfaces of a tubular envelope of cured rubber, a pair of opposed contact strips, placing within said envelope and between said strips a core to maintain said strips in spaced relation, attaching to the upper exterior surface of said envelope an elongated strip of cloth, mounting a plurality of bushings in openings of a metal shell, with the lower portions of said bushings protruding underneath the base of said shell, placing a plurality of cured rubber supports in said shell, then sealing one end of said envelope with a cured rubber plug, placing the envelope on said supports in spaced relation to the walls of said shell, placing the shell in a mold to rest on the protruding portions of said bushings, together with uncured rubber strips and then applying heat to said mold to cause the uncured rubber to fuse with the cured rubber envelope, the cured rubber supports and the cured rubber plug to form a housing for the contact strips with said shell and said bushings embedded therein, then removing the housing from said mold and withdrawing the core, then sealing the other end of said envelope with a cured rubber plug, placing said end in an end mold in spaced relation to the said end of said mold, together with uncured rubber, then applying heat to said mold to cause the uncured rubber to fuse with the adjacent portion of the housing, and the last mentioned cured rubber plug.

10. A process for making treadle switches consisting in attaching a plurality of rivets to an elongated contact strip, attaching the contact strip to the upper, interior surface of a tubular envelope of cured rubber by means of the rivets, attaching a second contact strip to the lower, interior surface of the tubular envelope opposed to the first contact strip, placing within said envelope and between said contact strips a core to maintain said strips in spaced relation, mounting a plurality of bushings in openings of a metal shell, with the lower portions of said bushings protruding underneath the base of said shell, placing a plurality of cured rubber supports in the metal shell, placing the envelope on said supports in spaced relation relative to the walls of said shell, placing the shell in a mold to rest in said mold on the protuding portions of said bushings, together with uncured rubber strips between the cured rubber envelope and said shell, then applying heat to said mold to cause the uncured rubber to fuse with the cured rubber envelope and the cured rubber supports, and to flow around the shell to form a rubber housing for the contact strips with said shell and said bushings embedded therein, then removing the housing from the mold and withdrawing the core.

11. A process for making treadle switches consisting in attaching a plurality of rivets to an elongated contact strip, attaching to the upper, exterior surface of a tubular envelope of cured rubber, an elongated strip of fabric, attaching the contact strip to the upper, interior surface of the tubular envelope by means of the rivets passing through the tubular envelope and the strip of fabric, attaching a second contact strip to the lower, interior surface of the tubular envelope opposed to the first contact strip, placing within said envelope and between said contact strips a core to maintain said strips in spaced relation, mounting a plurality of bushings in openings of a metal shell, with the lower portions of said bushings protuding underneath the base of said shell, placing a plurality of cured rubber supports in the metal shell, placing the envelope on said supports in spaced relation relative to the walls of said shell, placing the shell in a mold to rest in said mold on the protruding portions of said bushings, together with uncured rubber strips between the cured rubber envelope and said shell, then applying heat to said mold to cause the uncured rubber to fuse with the cured rubber envelope and the cured rubber supports, and to flow around the shell to form a rubber housing for the contact strips with said shell and said bushings embedded therein, then removing the housing from the mold and withdrawing the core.

12. A process for making treadle switches consisting in attaching to the inner surfaces of a tubular envelope of cured rubber a pair of opposed contact strips, placing within said envelope and between said contact strips a core to maintain said strips in spaced relation, mounting a plurality of bushings in openings of a metal shell, with the lower portions of said bushings protruding underneath the base of said shell, placing a plurality of cured rubber supports in the metal shell, placing the envelope on said supports in spaced relation reltative to the walls of said shell, placing the shell in a mold, with the pins in said mold passing through the openings in the bushings of the shell, to rest in said mold on the protruding portions of said bushings, together with uncured rubber strips between the cured rubber envelope and said shell, then applying heat to said mold to cause the uncured rubber to fuse with the cured rubber envelope and the cured rubber supports and to flow around the shell, to form a rubber housing for the contact strips with said shell and said bushings embedded therein, then removing the housing from the mold, and pins to leave through openings in said housing, and withdrawing the core.

13. A process for making treadle switches consisting in attaching a plurality of rivets to an elongated contact strip, attaching to the upper, exterior surface of a tubular envelope of cured rubber, an elongated strip of fabric, attaching the contact strip to the upper, interior surface of the tubular envelope by means of the rivets passing through the tubular envelope and the strip of fabric, attaching a second contact strip to the lower, interior surface of the tubular envelope opposed to the first contact strip, placing within said envelope and between said strips a core to maintain said strips in spaced relation, mounting a plurality of bushings in openings of a metal shell, with the lower portions of said bushings protruding underneath the base of said shell, placing a plurality of cured rubber supports in said shell, then sealing one end of said envelope with a cured rubber plug, placing the envelope on said supports in spaced relation to the walls of said shell, placing the shell in a mold to rest on the protruding portions of said bushings, together with uncured rubber strips and then applying heat to said mold to cause the uncured rubber to fuse with the cured rubber envelope, the cured rubber supports and the cured rubber plug to form a housing for the contact strips with said shell and said bushings embedded therein, then removing the housing from said mold and withdrawing the core.

14. A process for making treadle switches consisting in attaching a plurality of rivets to an elongated contact strip, attaching to the upper, exterior surface of a tubular envelope of cured rubber, an elongated strip of fabric, attaching the contact strip to the upper, interior surface of the tubular envelope by means of the rivets passing through the tubular envelope and the strip of fabric, attaching a second contact strip to the lower, interior surface of the tubular envelope opposed to the first contact strip, placing within said envelope and between said strips a core to maintain said strips in spaced relation, mounting a plurality of bushings in openings of a metal shell, with the lower portions of said bushings protruding underneath the base of said shell, placing a plurality of cured rubber supports in said shell, then sealing one end of said envelope with a cured rubber plug, placing the envelope on said supports in spaced relation to the walls of said shell, placing the shell in a mold to rest on the protruding portions of said bushings, together with uncured rubber strips and then applying heat to said mold to cause the uncured rubber to fuse with the cured rubber envelope, the cured rubber supports and the cured rubber plug to form a housing for the contact strips with said shell and said bushings embedded therein, then removing the housing from said mold and withdrawing the core, then sealing the other end of said envelope with a cured rubber plug, placing said end in an end mold in spaced relation to the said end of said mold together with uncured rubber, then applying heat to said mold to cause the uncured rubber to fuse with the adjacent portion of the housing, and the last mentioned cured rubber plug.

15. A process for making treadle switches consisting in attaching a plurality of rivets to an elongated contact strip, attaching to the upper, exterior surface of a tubular envelope of cured rubber an elongated strip of fabric, attaching the contact strip to the upper, interior surface of the tubular envelope by means of the rivets passing through the envelope and the strip of fabric, attaching a second contact strip to the lower, interior surface of the envelope opposed to the first contact, placing within the envelope and between said contact strips a core to maintain said strips in spaced relation, mounting a plurality of bushings in openings of a metal shell with the lower portions of said bushings protruding underneath the base of said shell, placing a plurality of cured rubber supports in the shell, sealing one end of the envelope with a cured rubber plug, placing the envelope on said supports in spaced relation to the walls of said shell, placing the shell in a mold, with pins in said mold passing through the openings of said bushings, to rest in said mold on the lower portions of said bushings, together with uncured rubber strips between the cured rubber envelope and said shell, then applying heat to said mold to cause the uncured rubber to fuse with the cured rubber envelope, the cured rubber supports and the cured rubber plug to form a housing for the contact strips with said shell and said bushings embedded therein, then removing said housing from said mold, withdrawing the pins from said housing to form through openings in the housing, and withdrawing the core.

16. A process for making treadle switches consisting in attaching a plurality of rivets to an elongated contact strip, attaching to the upper, exterior surface of a tubular envelope of cured rubber an elongated strip of fabric, attaching the contact strip to the upper, interior surface of the tubular envelope by means of the rivets passing through the envelope and the strip of fabric, attaching a second contact strip to the lower, interior surface of the envelope opposed to the first contact, placing within the envelope and between said contact strips a core to maintain said strips in spaced relation, mounting a plurality of bushings in openings of a metal shell with the lower portions of said bushings protruding underneath the base of said shell, placing a plurality of cured rubber supports in the shell, sealing one end of the envelope with a cured rubber plug, placing the envelope on said supports in spaced relation to the walls of said shell, placing the shell in a mold, with pins in said mold passing through the openings of said bushings, to rest in said mold on the lower portions of said bushings, together with uncured rubber strips between the cured rubber envelope and said shell, then applying heat to said mold to cause the uncured rubber to fuse with the cured rubber envelope, the cured rubber supports and the cured rubber plug to form a housing for the contact strips with said shell and said bushings embedded therein, then removing said housing from said mold, withdrawing the pins from said housing to form through openings in the housing, and withdrawing the core, then sealing the other end of said envelope with a cured rubber plug, placing said end in an end mold in spaced relation to the said end of said mold together with uncured rubber, then applying heat to said mold to cause the uncured rubber to fuse with the adjacent portion of the housing, and the last mentioned cured rubber plug.

BENJAMIN COOPER.